United States Patent
Dammen et al.

(10) Patent No.: US 9,801,326 B2
(45) Date of Patent: Oct. 31, 2017

(54) METHOD FOR REMOVING DUST FROM SEEDS

(71) Applicant: PIONEER HI-BRED INTERNATIONAL, INC., Johnston, IA (US)

(72) Inventors: Michael K. Dammen, Urbandale, IA (US); Timothy P. Meyer, Clive, IA (US)

(73) Assignee: PIONEER HI-BRED INTERNATIONAL, INC., Johnston, IA (US)

( * ) Notice: Subject to any disclaimer, the term of this patent is extended or adjusted under 35 U.S.C. 154(b) by 237 days.

(21) Appl. No.: 14/776,871

(22) PCT Filed: Mar. 11, 2014

(86) PCT No.: PCT/US2014/023666
§ 371 (c)(1),
(2) Date: Sep. 15, 2015

(87) PCT Pub. No.: WO2014/150574
PCT Pub. Date: Sep. 25, 2014

(65) Prior Publication Data
US 2016/0029549 A1 Feb. 4, 2016

Related U.S. Application Data

(60) Provisional application No. 61/793,062, filed on Mar. 15, 2013.

(51) Int. Cl.
*A01C 1/06* (2006.01)
*A01C 1/00* (2006.01)

(52) U.S. Cl.
CPC . *A01C 1/06* (2013.01); *A01C 1/00* (2013.01)

(58) Field of Classification Search
CPC .................................. A01C 1/06; A01C 1/00
See application file for complete search history.

(56) References Cited

U.S. PATENT DOCUMENTS

| | | |
|---|---|---|
| 5,494,709 A | 2/1996 | Long, Jr. et al. |
| 5,567,238 A | 10/1996 | Long, Jr. et al. |

(Continued)

FOREIGN PATENT DOCUMENTS

| | | |
|---|---|---|
| DE | 3615139 A1 | 11/1987 |
| FR | 2675009 A1 | 10/1992 |

OTHER PUBLICATIONS

International Search Report and Written Opinion for International Application No. PCT/US14/23666, dated Aug. 13, 2014.

*Primary Examiner* — Kristen C Hayes
(74) *Attorney, Agent, or Firm* — Pioneer Hi-Bred Int'l, Inc.

(57) ABSTRACT

Embodiments of a technique are provided for removing dust from treated seeds. The method includes applying a treatment to a number of seeds at a seed treatment station and at least partially drying the seeds at the treatment station. The partially dried seeds may then be conveyed through a conveying station from the treatment station to an output area. Air may be directed through an inlet of the conveying station, where the directed air is configured to remove non-seed particles from the seeds. Furthermore, air may be filtered through an outlet of the conveying station to capture the removed non-seed particles using a filtering system. In some cases, an initial temperature of the air may be controlled to optimize the dust removal process, such as by heating and/or chilling the air.

15 Claims, 7 Drawing Sheets

(56) References Cited

U.S. PATENT DOCUMENTS

| | | | | |
|---|---|---|---|---|
| 5,974,734 A | * | 11/1999 | Eastin | A01C 1/02 424/93.1 |
| 2002/0121047 A1 | * | 9/2002 | Thrash | A01C 1/00 47/58.1 SE |
| 2007/0207485 A1 | * | 9/2007 | Deppermann | G01N 1/04 435/6.12 |
| 2014/0206535 A1 | * | 7/2014 | Faust | C05G 3/00 504/100 |

* cited by examiner

METHOD FOR REMOVING DUST FROM SEEDS

FIELD OF THE INVENTION

The present invention relates generally to methods for removing undesirable particles, such as dust and foreign debris, from seeds.

BACKGROUND

Seeds may be treated (e.g., coated) for many reasons prior to being sold to a grower. The treatment process often results in undesirable side effects, and dealing with these effects often slows down the processing of the seeds, costing agricultural companies that are producing the seeds for commercial sale significant time and money.

Accordingly, there is a need in the art for a method for processing seeds following treatment that allows the seeds to be prepared for end use in an expedited, efficient, and less costly manner.

BRIEF SUMMARY OF VARIOUS EMBODIMENTS

The present invention addresses the above needs and achieves other advantages by providing a system and method for removing dust from a plurality of treated seeds. In general, the method includes applying a treatment to a plurality of seeds at a seed treatment station and at least partially drying the seeds at the treatment station. The partially dried seeds are then conveyed through a conveying station from the treatment station to an output area. Air is directed through an inlet of the conveying station, wherein the directed air is configured to remove non-seed particles from the seeds, and the air from an outlet of the conveying station may be filtered to capture the removed non-seed particles using a filtering system.

In some embodiments, the treatment station may comprise a bowl treater configured to apply one or more seed treatments to the plurality of seeds. Moreover, the conveying station may comprise an oscillating table. The oscillating table may comprise a fluidized bed dryer.

The filtering system may comprise an initial filter system and a return air filter system. The initial filtering system may be configured to filter air at a rate of approximately 25,000 cubic feet per minute, and the return air filtering system may be configured to filter return air at a rate of approximately 26,000 cubic feet per minute. In some cases, the return air filtering system may comprise a charcoal filter bank.

Furthermore, in some embodiments, an initial temperature of the directed air may be controlled. For example, the directed air may be heated, such as using a boiler system. Additionally or alternatively, an initial humidity of the directed air may be controlled. For example, humidity may be removed from the directed air, such as by using a chilling system.

BRIEF DESCRIPTION OF THE DRAWINGS

Figure 1:
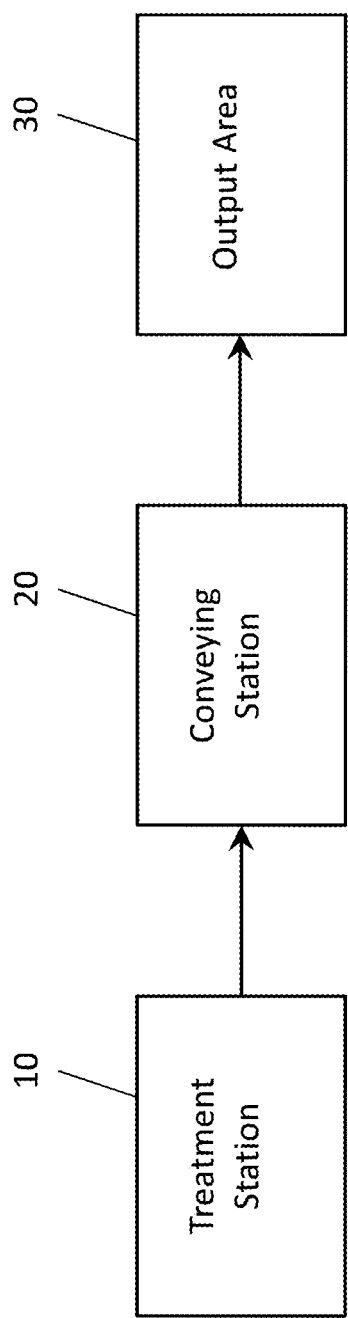
Figure 2:
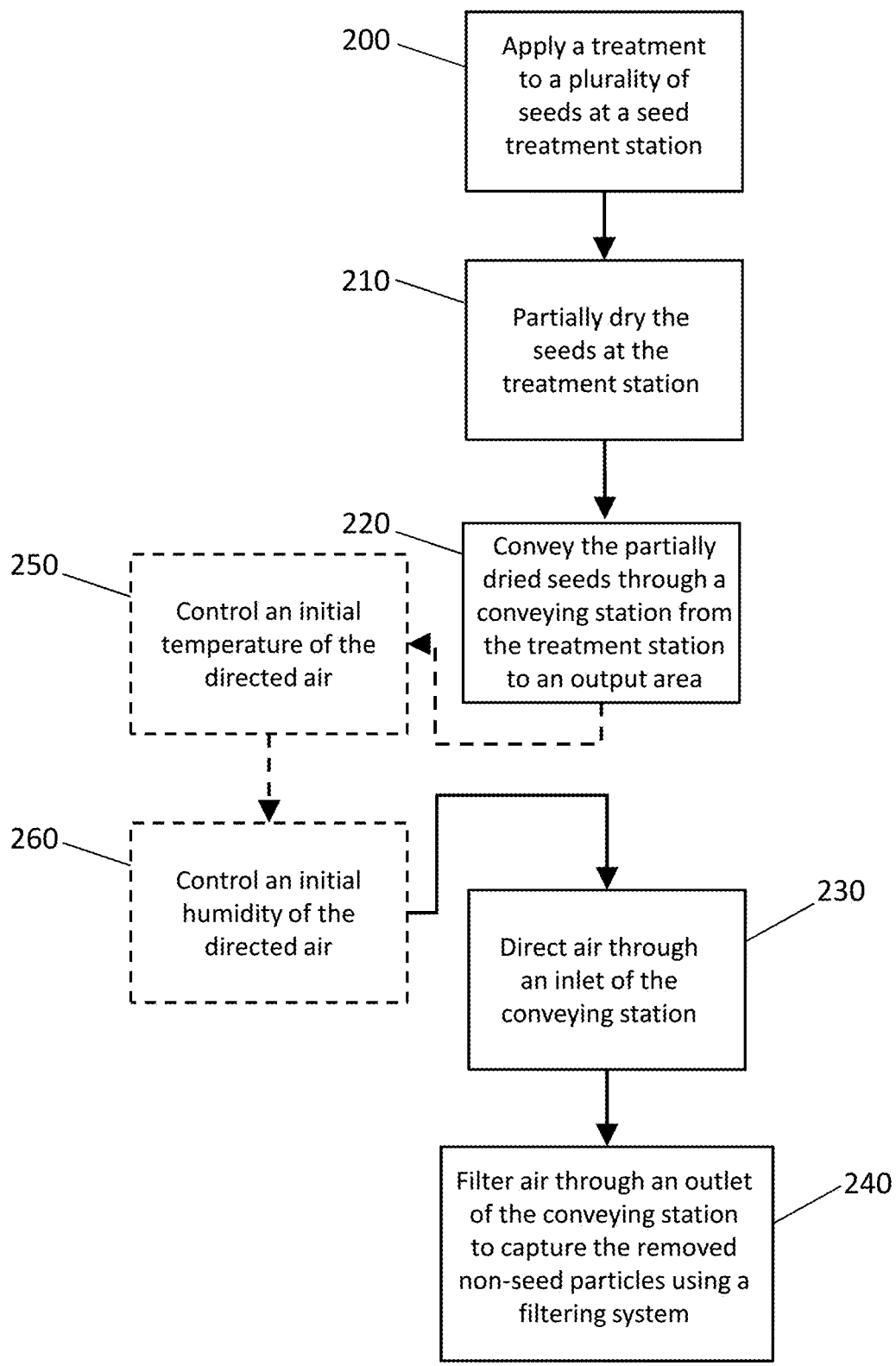
Figure 3:
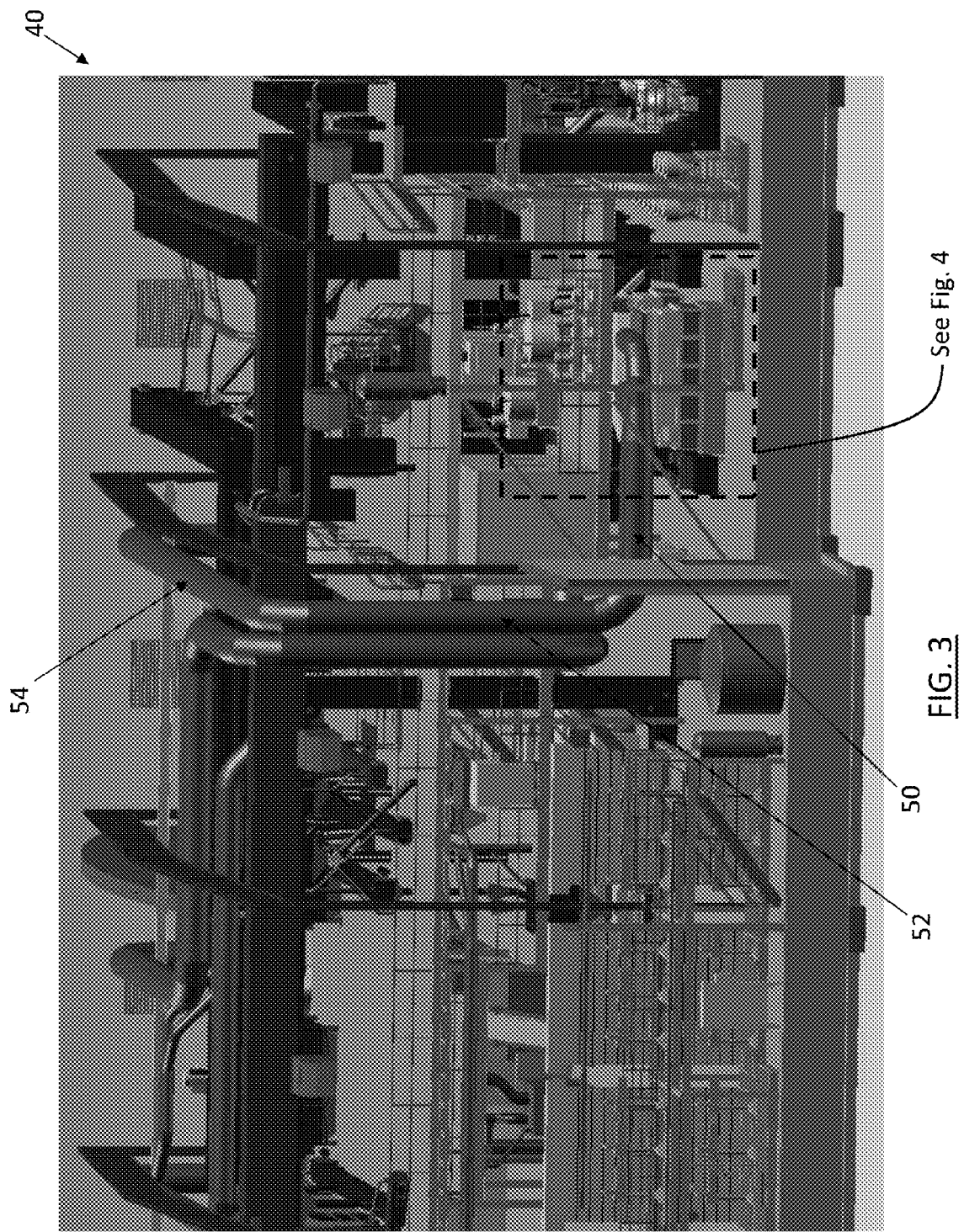
Figure 4:
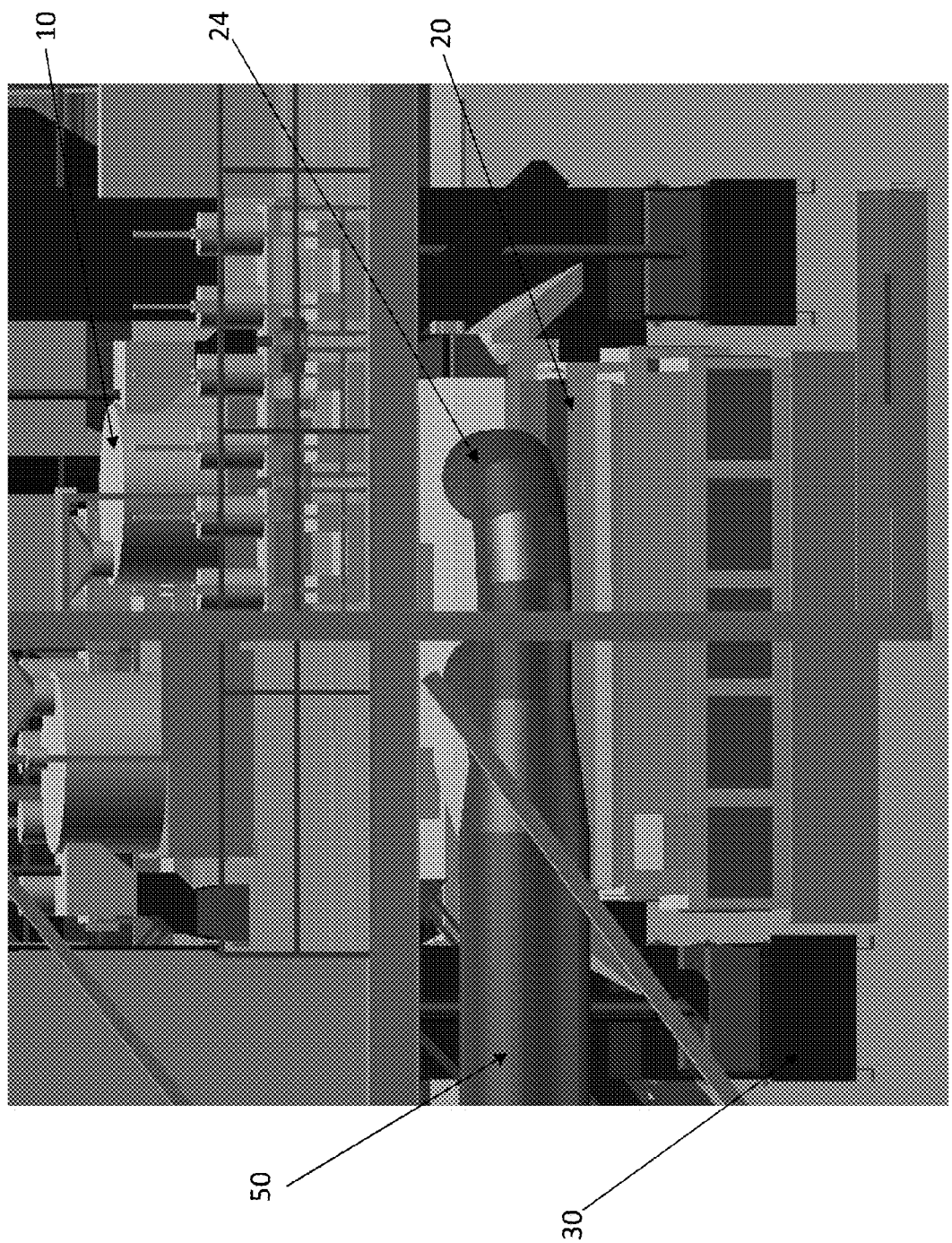
Figure 5:
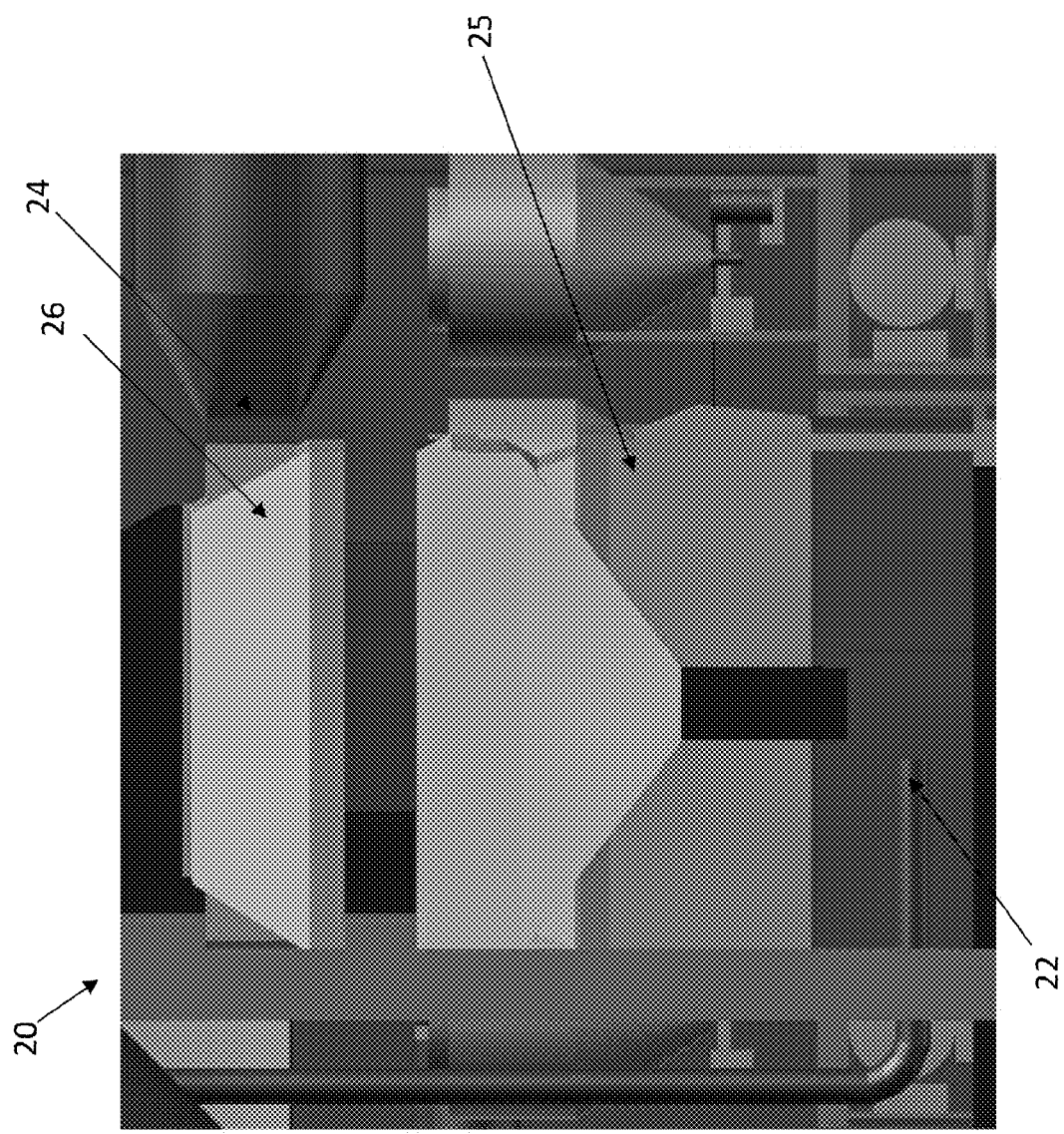
Figure 6:
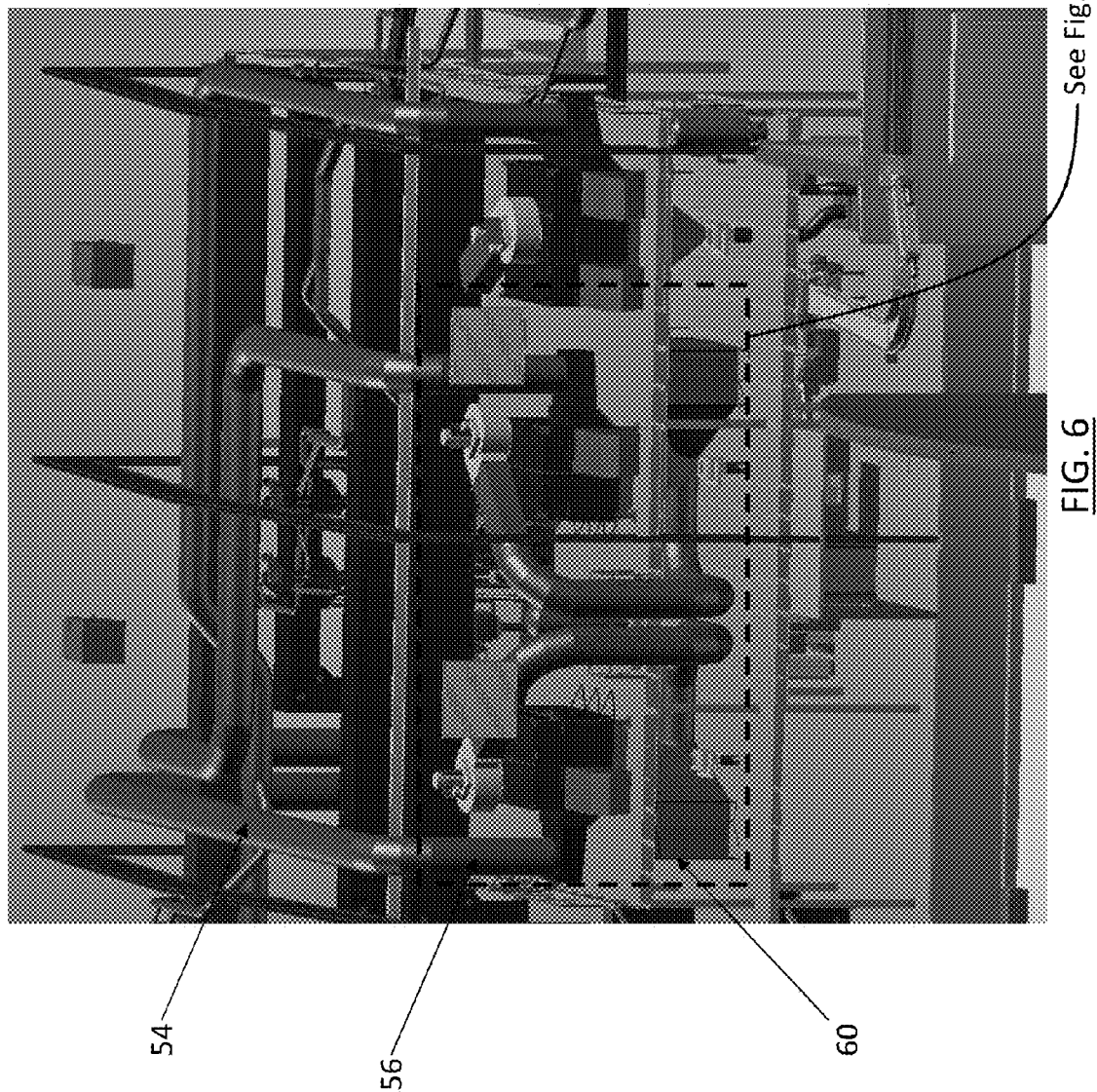
Figure 7:
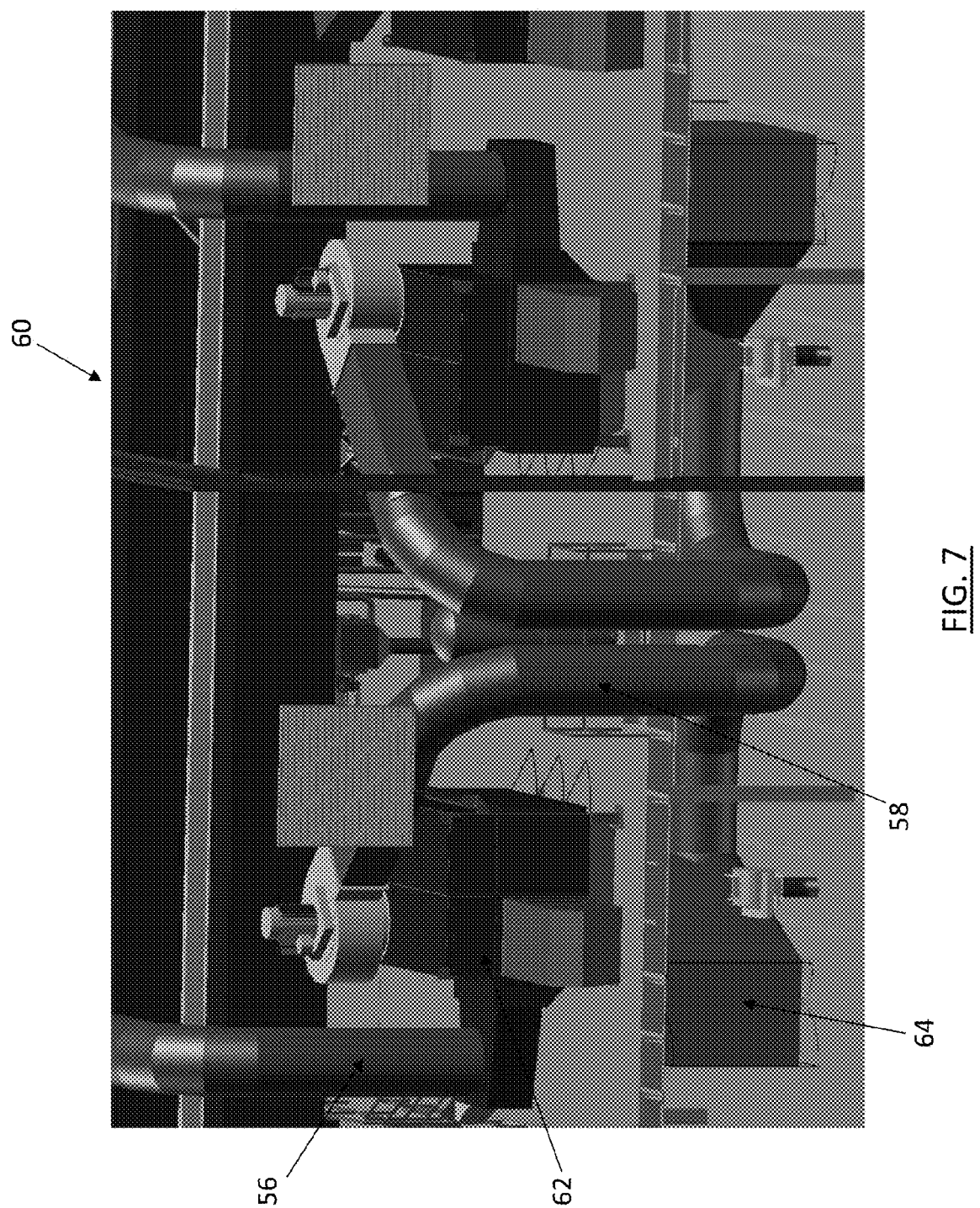

Having thus described the invention in general terms, reference will now be made to the accompanying drawings, which are not necessarily drawn to scale, and wherein:

FIG. 1 shows a schematic representation of a system for removing dust from a plurality of treated seeds in accordance with an exemplary embodiment of the present invention;

FIG. 2 illustrates a flowchart of a method of removing dust from a plurality of treated seeds in accordance with an exemplary embodiment of the present invention;

FIG. 3 illustrates a front view of part of a seed production facility in accordance with an exemplary embodiment of the present invention;

FIG. 4 shows a close up view of a seed treatment station, a conveying station, and an output area of the seed production facility of FIG. 3 in accordance with an exemplary embodiment of the present invention;

FIG. 5 illustrates a close up side view of the conveying station of FIG. 4 in accordance with an exemplary embodiment of the present invention;

FIG. 6 illustrates a rear view of part of a seed production facility with a filtering system in accordance with an exemplary embodiment of the present invention; and FIG. 7 shows a close up view of the filtering system of FIG. 6 in accordance with an exemplary embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the seed production facility and equipment are not shown in one or more of the figures for clarity and to facilitate explanation of embodiments of the present invention.

Agricultural companies tasked with providing bulk quantities of seeds to growers for large-scale growing activities often have a need to treat seeds prior to their sale, for example, to protect against crop damage by certain pests or diseases, or to imbue the resulting crop with certain qualities or characteristics. The seeds may include seeds for various types of grains such as, for example, corn, soybeans, canola, wheat, oat, rye, alfalfa, barley, rice, and sunflowers, among other crops.

In cases where the treatment is applied as a coating to the exterior of the seed, the seed typically must be dried following the application of the coating so that the seed can be successfully advanced through the seed production facility. Thorough seed drying is important, for example, to prevent seeds from sticking together or from sticking to processing equipment of the seed production facility, which would impair, or at least delay, the seed preparation process.

To ensure that seeds are properly dried prior to advancing to the next stage in the seed preparation process, the seeds may be dried for a longer period of time. Drying for longer times may, however, result in the seeds being unnecessarily delayed from advancing to the next step in the process (e.g., if the seeds are dry, yet are kept in the seed dryer unnecessarily). Moreover, certain types of drying methods that use kinetics to dry the seeds, such as when seeds are chemically treated in a bowl and then spun to dry, may result in some of the coating that was applied being knocked off the seeds, which can create dangerous dust particles and/or damage the underlying seeds due to unnecessary impact with other seeds through the drying process. In addition, if too much treatment or coating is knocked off the seed, the application rate of the treatment will be affected, which can reduce the efficacy of the treatment.

Accordingly, embodiments of a method are provided for removing dust from a plurality of treated seeds. The inventors have discovered that removal of dust from the seeds in accordance with the embodiments described below not only provides for a safer seed production environment (e.g., by reducing the amount of dust in the air that may otherwise have been created due to the dust being carried by the seeds), but also produces higher quality seeds in that the seeds are clean (e.g., do not carry with them undesirable particles) and sufficiently dry, which in turn facilitates downstream processing of the seeds.

With reference to FIGS. 1 and 2, in general, embodiments of the method include applying a treatment to a plurality of seeds at a seed treatment station 10 and at least partially drying the seeds at the treatment station. Blocks 200, 210. The partially dried seeds may then be conveyed through a conveying station 20 from the treatment station 10 to an output area 30. Block 220. Air may be directed through an inlet of the conveying station 20, where the directed air is configured to remove non-seed particles from the seeds. Block 230. In this regard, non-seed particles may include dust (e.g., dust generated during or following application of the treatment, such as treatment dust), foreign debris, or particles from the seed itself that have been broken off the main seed and are no longer useful to the end product. Furthermore, air from an outlet of the conveying station 20 may be filtered to capture the removed non-seed particles using a filtering system, as described in greater detail below. Block 240.

Referring to FIGS. 3 and 4, for example, a seed production facility 40 is illustrated that includes a treatment station 10, a conveying station 20, and an output area 30. The seed treatment station 10 may be, for example, a bowl treater that is configured to apply one or more seed treatments (such as a coating) to the seeds while spinning the seed contents and treatment material held within the bowl treater (e.g., to evenly apply the treatment to the surface of the seeds). The treatment station 10 may further be configured to at least partially dry the seeds. For instance, in the example of the bowl treater noted above, the bowl treater may continue to spin the seeds following application of the treatment so as to at least partially dry the seeds before moving the seeds to the next step in the process.

Once the treatment is applied at the treatment station 10, and after the seeds are at least partially dried (e.g., via spinning), the treated seeds may still be somewhat wet. The partially dried seeds may then be moved from the treatment station 10 to an output area 30 via a conveying station 20 that extends between the treatment station and the output area. In this regard, the conveying station 20 may comprise a moving surface (not shown), such as a conveyer belt, upon which the treated seeds are deposited following the application of the treatment. In some embodiments, the conveying station 20 may comprise an oscillating table, such as a fluidized bed dryer 25 (shown in FIG. 5). One example of a fluidized bed dryer is sold by Oliver Manufacturing of Rocky Ford, Colo. In some cases, the oscillating table may be tilted to allow the force of gravity to urge the seeds to move in a direction towards the output area 30 (e.g., to expedite and facilitate conveyance of the seeds).

With reference to FIG. 5, which shows the conveying station 20 of FIG. 4 from the side (e.g., rotating the view of FIG. 4 by 90°), to further dry the seeds, air may be directed through an inlet 22 of the conveying station 20. The directed air may be configured (e.g., flowed at a particular volume flow rate, temperature, humidity, etc. and/or directed at to predefined angle with respect to the seeds, etc.) to remove non-seed particles from the seeds. For example, air may be directed through an inlet 22 located proximate a bottom of the oscillating table or fluidized bed dryer 25. The conveying surface of the fluidized bed dryer 25 (not shown) may, thus, be configured to allow the air up through the surface to dry the seeds lying thereon as the seeds are conveyed to the output area 30.

In this regard, the conveying station 20 may further include an outlet 24 through which the directed air is removed from the conveying station (e.g., after drying the seeds). In some embodiments, the outlet 24 may be part of or otherwise embodied by a hood 26, as shown in FIG. 5. The hood 26 may be disposed above the fluidized bed dryer 25, for example, and may be configured as an enclosure or canopy for withdrawing the dust-laden air (e.g., via suction) and directing the dust-laden air to a filtering system downstream. In some cases, for example, the hood 26 may include a fan configured to draw out air from the conveying station, such as a centrifugal fan. One example of a fan that may be provided in the hood 26 is a backward inclined fan having simple flat blades that are backwardly inclined to match the velocity pattern of the air passing through the fan wheel and that is configured for high-efficiency operation, such as a Camfil Farr® backward inclined fan rated for a volume flow rate of approximately 25,000 cubic feet per minute and configured to produce a static pressure of 12.0 inches water gauge.

With reference to FIGS. 3 and 4, in some embodiments, air from the outlet 24 of the conveying station 20 may be directed to a filtering system 60 (shown in FIGS. 6 and 7) to capture the removed non-seed particles. For example, a network of ducts may be provided that extends from the outlet 24 of the conveying station 20 to the filtering system 60 for directing the air to the filtering system. In the depicted embodiment of the figures, for example, the network of ducts may carry the air from a first area of the seed production facility (e.g., where the treatment station 10, conveying station 20, and outlet area 30 are provided) to another area of the seed production facility on an opposite side of the facility from the treatment station, conveying station, and outlet area (e.g., where the filtering system 60 is located).

In this regard, the network of ducts may include a first portion of ductwork 50 (shown in FIGS. 3 and 4), a second portion of ductwork 52 (shown in FIG. 3), a third portion of ductwork 54 (shown in FIGS. 3 and 6), and a fourth portion of ductwork 56 (shown in FIGS. 6 and 7). Although the depicted example includes four portions of ductwork 50, 52, 54, and 56, any number of portions may be used, and each portion may be sized (e.g., length and diameter) to meet the particular HVAC needs of the production facility for conveying the air from the outlet 24 to the filtering system 60.

Referring to FIGS. 6 and 7, the filtering system 60 may comprise one or more filtering systems (e.g., subsystems) for filtering the air. In some embodiments, the filtering system 60 may include an initial filter system 62 and a return air filter system 64. The initial filter system 62 may comprise, for example, a modular dust collector that includes multiple filter cartridges for removing non-seed particles from the air flowing through the filter. The initial filter system 62 may be configured to filter air at a rate of approximately 25,000 cubic feet per minute. One example of an initial filter system 62 is a Gold Series® Model GS24 modular dust collector manufactured by Camfil Fan of Stockholm, Sweden.

After passing through the initial filter system 62, the air may also pass through a return air filter system 64 via a fifth portion 58 of ductwork (FIG. 7). The return air filter system 64 may, in some cases, comprise a charcoal filter bank, such as a Camfil Farr® activated carbon filter, and may be configured to filter return air at a rate of approximately 26,000 cubic feet per minute. The filtered air may then be reintroduced into the seed production process or, in some cases, be safely released into the environment.

In some embodiments, the dust removal method may be optimized or enhanced by controlling certain variables. For example, referring again to FIGS. 3 and 5, an initial temperature of the directed air (e.g., prior to being introduced into the conveying station 20 via the inlet 22) may be controlled. See FIG. 2, Block 250. In some cases, the initial temperature of the directed air may be controlled by heating the directed air, such as by heating via a boiler system. The air may be heated to a temperature of up to 20° C. above ambient, which may serve to dry the seeds in a more efficient manner (e.g., faster than air at ambient temperature).

In still other embodiments, an initial humidity of the directed air may be controlled. See FIG. 2, Block 260. Controlling the initial humidity of the directed air may be accomplished by removing humidity from the directed air, such as using a chiller system upstream of the inlet 22 shown in FIG. 3. Accordingly, in some embodiments, a chiller system may be used in conjunction with a boiler system to prepare the air entering into the conveying station 20 via the inlet 22, such that the air that is being directed into the conveying station 20 for removing non-seed particles from the seeds is better suited for drying the seeds and/or removing the particles, as described above.

Exemplary embodiments of the present invention have been described above with reference to block diagrams and flowchart illustrations of methods and apparatuses (e.g., systems), such as those shown in FIGS. 1 and 2. In some embodiments, certain ones of the operations shown in FIG. 2 above may be modified or further amplified as described above. Furthermore, in some embodiments, additional optional operations may be included, some examples of which are shown in dashed lines in FIG. 2. Modifications, additions, or amplifications to the operations above may be performed in any order and in any combination.

Many modifications and other embodiments of the invention will come to mind to one skilled in the art to which this invention pertains having the benefit of the teachings presented in the foregoing descriptions and the associated drawings. For example, a seed production facility may be designed having multiple seed treatment stations, conveying stations, and output areas, as well as multiple filtering systems, such that multiple batches of seeds may be processed in parallel.

Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for removing dust from a plurality of treated seeds, the method comprising:
   applying a treatment to a plurality of seeds at a seed treatment station, wherein the treatment station comprises a bowl treater configured to apply one or more seed treatments to the plurality of seeds;
   at least partially drying the seeds at the treatment station;
   conveying the partially dried seeds through a conveying station from the treatment station to an output area;
   directing air through an inlet of the conveying station, wherein the directed air is configured to remove non-seed particles from the seeds; and
   filtering air from an outlet of the conveying station to capture the removed non-seed particles using a filtering system.

2. The method of claim 1, wherein the conveying station comprises an oscillating table.

3. The method of claim 2, wherein the oscillating table comprises a fluidized bed dryer.

4. The method of claim 1, wherein the filtering system comprises an initial filter system and a return air filter system.

5. The method of claim 4, wherein the initial filtering system is configured to filter air at a rate of approximately 25,000 cubic feet per minute.

6. The method of claim 4, wherein the return air filtering system is configured to filter return air at a rate of approximately 26,000 cubic feet per minute.

7. The method of claim 4, wherein the return air filtering system comprises a charcoal filter bank.

8. The method of claim 1, further comprising controlling an initial temperature of the directed air.

9. The method of claim 8, wherein controlling the initial temperature of the directed air comprises heating the directed air.

10. The method of claim 9, wherein the directed air is heated using a boiler system.

11. The method of claim 1, further comprising controlling an initial humidity of the directed air.

12. The method of claim 11, wherein controlling the initial humidity of the directed air comprises removing humidity from the directed air.

13. The method of claim 12, wherein the humidity is removed from the directed air using a chilling system.

14. A method for removing dust from a plurality of treated seeds, the method comprising:
   applying a treatment to a plurality of seeds at a seed treatment station;
   at least partially drying the seeds at the treatment station;
   conveying the partially dried seeds through a conveying station from the treatment station to an output area;
   directing air through an inlet of the conveying station, wherein the directed air is configured to remove non-seed particles from the seeds; and
   filtering air from an outlet of the conveying station to capture the removed non-seed particles using a filtering system, wherein the filtering system comprises an initial filter system and a return air filter system.

15. A method for removing dust from a plurality of treated seeds, the method comprising:
   applying a treatment to a plurality of seeds at a seed treatment station;
   at least partially drying the seeds at the treatment station;
   conveying the partially dried seeds through a conveying station from the treatment station to an output area;
   directing air through an inlet of the conveying station, wherein the directed air is configured to remove non-seed particles from the seeds, and the initial temperature and humidity of the directed air is controlled; and filtering air from an outlet of the conveying station to capture the removed non-seed particles using a filtering system.

* * * * *